(12) United States Patent
Chapman et al.

(10) Patent No.: US 11,086,282 B2
(45) Date of Patent: Aug. 10, 2021

(54) INTERFACE FOR AUTOMATION CLIENT

(71) Applicant: SCHLUMBERGER TECHNOLOGY CORPORATION, Sugar Land, TX (US)

(72) Inventors: Clinton D. Chapman, Missouri City, TX (US); Han Yu, Sugar Land, TX (US); Mbaga Louis Ahorukomeye, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/811,840

(22) Filed: Mar. 6, 2020

(65) Prior Publication Data

US 2020/0233383 A1    Jul. 23, 2020

Related U.S. Application Data

(63) Continuation of application No. 14/763,518, filed as application No. PCT/US2014/031641 on Mar. 25, 2014.

(60) Provisional application No. 61/805,890, filed on Mar. 27, 2013.

(51) Int. Cl.
*G05B 19/042* (2006.01)
*E21B 44/00* (2006.01)
*G05B 11/01* (2006.01)

(52) U.S. Cl.
CPC .......... *G05B 19/0425* (2013.01); *E21B 44/00* (2013.01); *G05B 11/01* (2013.01); *G05B 19/0428* (2013.01); *G05B 2219/24026* (2013.01); *G05B 2219/33277* (2013.01)

(58) Field of Classification Search
CPC ................ G05B 19/0425; G05B 19/0428; G05B 11/01; E21B 44/00
USPC ............................................................ 700/9
See application file for complete search history.

(56) References Cited

U.S. PATENT DOCUMENTS

| 3,893,525 | A  | 7/1975  | Dower et al.   |
|-----------|----|---------|----------------|
| 4,814,968 | A  | 3/1989  | Fukumoto       |
| 5,522,459 | A  | 6/1996  | Padgett et al. |
| 2003/0129052 | A1 | 7/2003 | Johnson      |
| 2004/0128000 | A1 | 7/2004 | Phillips et al. |
| 2007/0276545 | A1 | 11/2007 | Smirnov     |
| 2008/0059038 | A1 | 3/2008 | Yoshida et al. |
| 2010/0305718 | A1 | 12/2010 | Clark et al. |
| 2011/0071960 | A1 | 3/2011 | Singh         |
| 2011/0303462 | A1 | 12/2011 | Lovorn et al. |

(Continued)

FOREIGN PATENT DOCUMENTS

| EP | 1898077 A2 | 3/2008 |
|----|------------|--------|
| WO | 9410613 A1 | 5/1994 |

*Primary Examiner* — Mohammad Ali
*Assistant Examiner* — Joshua T Sanders

(57) ABSTRACT

Automation agents are utilized to modify operating characteristics of a client, such as a piece of equipment. An operating characteristic of equipment can be selectively adjusted by modification of a set point value, which is associated with the operating characteristic of the equipment. The equipment can adjust the operating characteristic based upon the set point value. A remote control indication can be provided to indicate when a set point value is available for modification. The remote control indication is adjustable by an execution module associated with the (Continued)

equipment. A set point latch can be provided for indicating when the set point value is modifiable by an automation agent.

20 Claims, 13 Drawing Sheets

(56) References Cited

U.S. PATENT DOCUMENTS

2013/0282150 A1   10/2013   Panther et al.

INTERFACE FOR AUTOMATION CLIENT

CROSS-REFERENCE TO RELATED APPLICATIONS

This application claims priority to U.S. Provisional Patent Application Ser. No. 61/805,890 filed Mar. 27, 2013 and PCT Application PCT/US204/031641 filed Mar. 25, 2014 and claims priority to and is a continuation of U.S. patent application Ser. No. 14/763,518, titled "INTERFACE FOR AUTOMATION CLIENT," filed Jul. 26, 2015. The entire disclosures of all three applications are hereby incorporated herein by reference.

BACKGROUND

Industrial and process control systems include various types of control equipment used in industrial production, such as Supervisory Control and Data Acquisition (SCADA) systems, Distributed Control Systems (DCS), and other control equipment using, for example, Programmable Logic Controllers (PLC). These control systems can be used in industries including electrical, water, oil, gas, and data. Using information collected from remote stations in the field, automated and/or operator-driven supervisory commands can be transmitted to field control devices. These field devices control local operations, such as opening and closing valves and breakers, collecting data from sensor systems, and monitoring a local environment for alarm conditions. For example, in the oil and gas industry, oil wells are created by drilling a hole into the earth utilizing a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be utilized to cool the bit and lift rock cuttings to the surface. During such drilling operations, a drilling apparatus can be controlled manually, automatically, and various combinations thereof to provide effective operations. For example, some operations are controlled manually and other operations are controlled automatically.

SUMMARY

Aspects of the disclosure can relate to a method for facilitating automation of equipment, such as industrial equipment. The method may include selectively adjusting an operating characteristic of equipment by an exposed set point value, which is associated with the operating characteristic of the equipment. The method may also include providing a remote control indication for indicating when a set point value is available for modification. The remote control indication can be adjusted by an execution module associated with the equipment. The method also includes providing a set point latch that represents a value for indicating when the set point value is modifiable by an automation agent. The automation agent can automatically adjust the operating characteristic by modification of the set point value when the set point latch is latched.

Other aspects of the disclosure can relate to a computing device for facilitating automation of equipment. The computing device may selectively adjust an operating characteristic of the equipment by modification of a set point value, which is associated with the operating characteristic of the equipment. The computing device can provide a remote control indication for indicating when a set point value is available for modification and provide a set point latch for indicating when the set point value is modifiable by an automation agent. The automation agent can automatically adjust the operating characteristic by modification of the set point value when the set point latch is latched.

Also, aspects of the disclosure can relate to a system for facilitating automation of equipment. The system includes equipment having a memory for storing a set point value associated with an operating characteristic of the equipment. The equipment is operable to adjust the operating characteristic based upon the set point value. The system also includes an automation agent for automatically adjust the operating characteristic by modification of the set point value. The set point latch indicates when the set point value is to be modified by the automation agent. The system also includes an execution module connected with the equipment to selectively adjusting the operating characteristic by the modification of the set point value. The equipment may apply the set point value when the set point latch is latched and the set point value is available for remote control as indicated by a remote control indication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The Detailed Description is described with reference to the accompanying figures. The use of the same reference numbers in different instances in the description and the figures may indicate similar or identical items.

DETAILED DESCRIPTION

Figure 1:
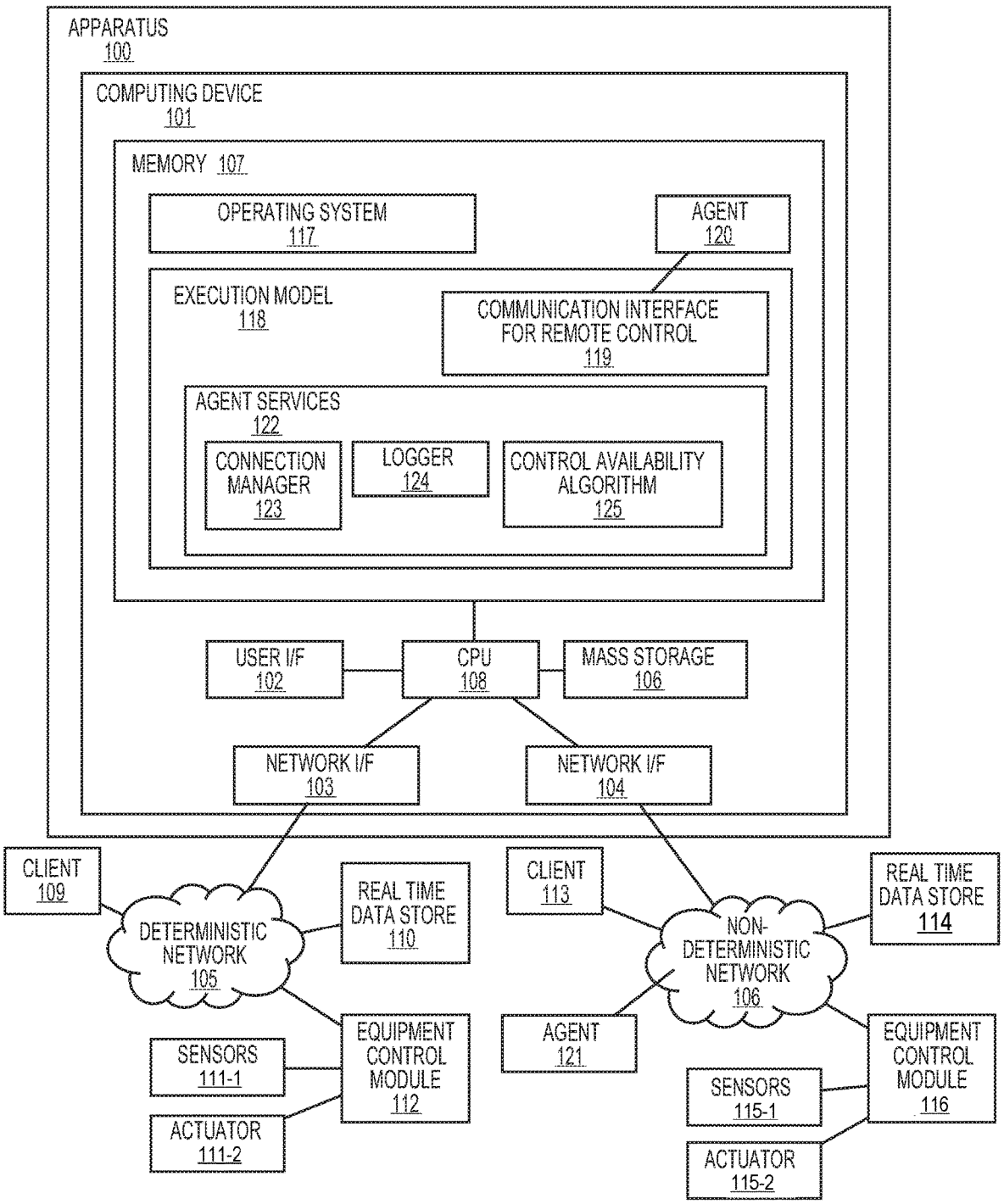
FIG. 1 is a diagrammatic illustration of a block diagram of a computing device for facilitating automation of equipment (e.g., a client) in accordance with an example embodiment of the present disclosure, where the computing device includes a control module that is communicatively connected to the equipment.

Referring generally to FIGS. 1 through 13, a system for facilitating automation of equipment, such as industrial equipment, is described. The system includes equipment (e.g., one or more clients) and a control module configured to control (e.g., remotely control) the equipment. For example, the system comprises an industrial or process control system that can automate an oil and gas process, or a portion of an oil and gas process.

In embodiments of the disclosure, an oil and gas process can be considered to be an industrial process related to the oil and gas industry and at least partially performing physical activities using one or more process components. Process components can be considered to be controllable hardware and/or software entities that implement a physical oil and gas process (e.g., drilling rig equipment, machines and devices, and any hardware/software controllers). Other processes associated with the oil and gas industry, including other processes associated with drilling production or related activities, can also utilize the techniques described herein. However, the oil and gas industry is provided by way of example only and is not meant to limit the present disclosure. The techniques described herein can be used in other industrial and automation process control system settings, including, but not necessarily limited to: manufacturing, production, power generation, fabrication, refining, water and wastewater, electrical power transmission and distribution, wind farms, large communication systems, chemical, pharmaceutical, food and beverage, pulp and paper, mining, metals, and so forth.

In addition, in embodiments of the disclosure, an automation system can be considered to be a software and/or hardware environment that hosts one or more state machines and provides an interface to permit agents, the state machine or the automation system to receive data from external sensors and data acquisition hardware/software associated with a process, and to send commands or otherwise control process components to perform a process according to a control algorithm.

An agent, in embodiments of the disclosure, can be considered to be a software process that runs independently with some degree of autonomy, and that interacts with process components, controllers and/or an intermediate service, such as an automation system, that provides access to the process components and/or the controllers.

As disclosed herein, the agents may comprise deployable agents that facilitate a communication interface utilized to provide set point values and possibly corresponding fail-safe set point values to furnish functionality to control a particular piece of equipment. For example, a Boolean flag for a mud pump may be transitioned from a false Boolean value to a true Boolean value to indicate that remote automation control is possible to a deployable agent associated with the mud pump. Once the automation agent receives the indication that remote control is possible, the automation agent may adjust one or more operating characteristics (e.g., a mud flow rate) of the mud pump by modifying one or more set point values and a possibly corresponding fail-safe set point and then set a corresponding set point latch to indicate to the equipment controller that it should use the specified set point exposed by the equipment controller. This can allow other, non-specified, set points that are not used by the automation agents to still be controllable by an operator. For instance, the mud flow rate of the mud pump may be controlled by the automation agent while the set point latch is set to a true Boolean value, and the operator may control one or more other operating characteristics of the mud pump such as transmission gear. The operating characteristic may comprise any controllable value associated with an equipment control module 112, 116. For example, the operating characteristic may comprise, but is not limited to, a revolution per minute value, a throttle position, a maximum torque, direction, and/or an automation routine whose functionality is associated with the equipment control module 112, 116. Further, in some embodiments, the operator can also control other operating characteristics that are not currently under control by an external agent. The equipment controlled by an equipment control module 112, 116 may comprise, but is not limited to, a mud pump, a hoist, a rotary device, a choke, a valve, an alarm device, a blowout preventer (BOP), an auto-driller or the like. Recommended fail-safe set point values can be utilized as set point values such that in an operating state causing a fail-safe condition (e.g., a communication loss), the equipment can transition to a predetermined safe state which can vary depending upon the operation being executed by the deployable agent. For the purposes of the present disclosure, the term "fail-safe state" is used to refer to a state that is more stable than a previous state the equipment was operating at before implementing the "fail-safe state." For instance, during a communication loss, the deployable agent may automatically adjust an operating characteristic such as a number of revolutions per minute (RPM) based upon a corresponding fail safe set point value. In this example, the deployable agent can reduce the number of RPMs.

FIG. 1 illustrates example apparatus 100, such as a drilling rig, or the like, that includes a computing device 101 in which a control system can be implemented. The computing device 101 is illustrated as including one or more computers having a central processing unit 108 including at least one hardware-based microprocessor coupled to a memory 107, which can represent the random access memory (RAM) devices that includes the main storage of computing device 101, as well as any supplemental levels of memory, e.g., cache memories, non-volatile or backup memories (e.g., programmable or flash memories), read-only memories, etc. In addition, the memory 107 can be considered to include memory storage physically located elsewhere in computing device 101, e.g., any cache memory in a microprocessor, as well as any storage capacity used as a virtual memory, e.g., as stored on a mass storage device 106 or on another computer coupled to computing device 101.

Computing device 101 may receive a number of inputs and outputs for communicating information externally and stores information internally within the memory 107. For interfacing with a user or operator, computing device 101 may include a user interface 102 incorporating one or more user input devices (e.g., a keyboard, a pointing device, a display, a printer, etc.). Otherwise, user input can be received via another computer or terminal (e.g., over a network interface 103, 104 coupled to a network, such as networks 105, 106). Computing device 101 also can be in communication with one or more mass storage devices 106, which can be, for example, internal hard disk storage devices, external hard disk storage devices, storage area network devices, etc.

In this embodiment, computing device 101 additionally serves as a secure bridge between a deterministic network 105 and a non-deterministic network 106. Deterministic network can have coupled thereto one or more clients 109, real time data stores 110, sensors 111-1, actuator 111-2 and equipment control module 112. Likewise, non-deterministic network can have coupled thereto one or more clients 113, real time data stores 114, sensors 115-1, actuator 115-2, and equipment control module 116. Clients 109, 113 in this regard can be considered to be clients of the computing device 101 (e.g., drilling equipment, etc.), while real time data stores 110, 114 can be considered to be any data store in which data related to a particular oil and gas process is collected and made accessible to the automation system. For example, the clients 109, 113 may comprise equipment, such as drilling equipment, that is communicatively connected to the computing device 101 through a respective network 105, 106. The sensors 111-1, 115-1 can be considered to include any sensors used to collect (e.g., measure) data related to a particular oil and gas process, while equipment controller modules 112, 116 can be considered to include any controller, such as a programmable logic controller (PLC) or supervisory control and data acquisition (SCADA) system utilized to perform the control of one or more pieces of equipment (e.g., for a drilling automation system, controllers that provide control over equipment related to managed pressure drilling service, an autodriller, downlink system, a controller to control an operation characteristic of the drilling equipment, etc.).

The deterministic network 105 can be implemented, for example, as a computer connected to a communication interface (e.g., a Profibus communication interface), and additionally can be coupled to one or more process components for which it is desirable to control in an oil and gas process, e.g., one or more equipment control modules 112 (e.g., various programmable logic controllers (PLCs) and supervisory control and data acquisition (SCADA)-connected hardware systems).

Computing device 101 may operate under the control of an operating system 117 and executes or otherwise relies upon various computer software applications, components, programs, objects, modules, data structures, etc., (e.g., an automation server, also referred to herein as an execution module 118).

The execution module 118 provides a communication interface for remote control 119 to the deterministic network 105 from the non-deterministic network 106 (e.g., a transmission control protocol/internet protocol network), and thus restricts access to deterministic network 105, and to the rig control, to authorized entities and systems. In addition, in some embodiments, equipment control modules 112, 116 can also be considered to function as process components for the purpose of controlling an oil and gas process. Further, in some embodiments another device coupled to a non-deterministic network 106 can be used as a gateway between computing device 101 and deterministic network 105.

The execution module 118 implements the communication interface for remote control 119 using technologies such as Object Linking and Embedding (OLE) for Process Control (OPC). An agent 120, 121 communicates to the communication interface for remote control 119 using a compatible protocol that can be implemented for various operating systems, programming language, software platforms and/or hardware platforms, thereby enabling agents to be implemented in any suitable software and/or hardware environment. For example, an agent can be resident on a laptop computer or a mobile device such that, when the computer or mobile device connects to a common network with the execution module 118, the agent 120, 121 is automatically connected to the execution module 118.

As shown in FIG. 1, the execution module 118 can include a number of software components, including, for example, a connection manager 123 and a logger 124. The connection manager 123 handles the connection and communication with the agents 120, 121. The logger 124 creates, saves, and provides access to a log of transactions within or with the execution module 118.

Figure 2:
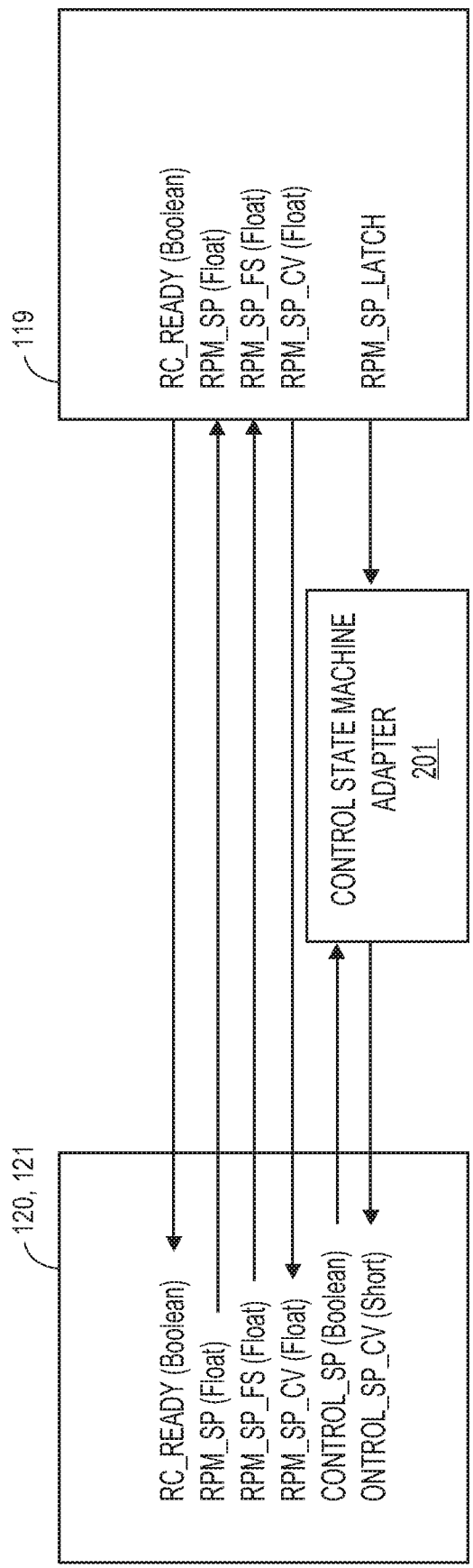
FIG. 2 is a block diagram illustrating a communication interface between the computing device and the equipment in accordance with an example embodiment of the present disclosure.

FIG. 2 illustrates an example communication interface for remote control 119 between a computing device 101 and an agent 120, 121. A control state machine adapter 201 can be utilized within an agent (agent 120, 121) to allow a greater resolution of the remote control state for the particular equipment desired to be controlled via the communication interface for remote control 119.

In an embodiment of the present disclosure, the system 100 establishes a communication interface with one or more of the agents 120, 121. The agents 120, 121 have memory associated therewith to store a set point value corresponding to an operating characteristic of the agent 120, 121. For example, the set point value may represent a torque value that causes a respective equipment control module 112, 116 to operate the drilling equipment at least at approximately a torque value. In another example, the set point value may represent a mud flow rate of a mud pump that causes the equipment control module 112, 116 to operate the mud pump at least at approximately a mud flow rate.

The communication interface for remote control 119 provides an interface for allowing an agent 120, 121 to determine a sub-set of operating characteristics are available for remote control. An example of this interface is provided in FIG. 2 as RC_READY, which comprises a Boolean value.

For a particular operating characteristic of equipment, the communication interface for remote control 119 provides an interface that allows an agent 120, 121 the ability to provide a set point; to provide a recommended set point to use in the event communication is lost, herein referred to as a fail-safe set point; an associated latch value that allows a particular set point and recommend fail-safe set point to be used remote control; and the current set point value used by the system. An example of these four values (or points) in FIG. 2 are, respectively, RPM_SP, RPM_SP_FS, RPM_SP_LATCH, and RPM_SP_CV.

The set point latch can be represented by a Boolean value, which is set to 'true' by the agent 120, 121 when the agent is allowed remote control (RC_READY in FIG. 2 example) to indicate to the execution module 118 that the current and future values for set point are to be used for the operating characteristic set point until the set point latch is set to 'false', or a fail-safe event occurs (e.g., communication is lost).

In one or more embodiments, the computing device 101 may provide a user interface 102 that provides the operator the ability to allow for remote control. If an operator indicates that a sub-set of operating characteristics are available for remote control, then an associated indication can be provided to agent 120, 121.

In one or more embodiments, the computing device 101 includes a control availability module 125. The control availability module 125 represents functionality to determine when it is appropriate to receive remote commands. If the control availability module 125 detects that a sub-set of operating characteristics are available for remote control, then an associated indication can be provided to agent 120, 121.

In one or more embodiments, the adapter 201, and respective agent 120, 121 may include state machine logic. The change in state within the state machine of the adapter 201 allows the agent 120, 121 to determine the current condition of the remote control readiness of the equipment controlled through computing device 101 and exposed by the communication interface for communication interface for remote control 119.

Figure 3:
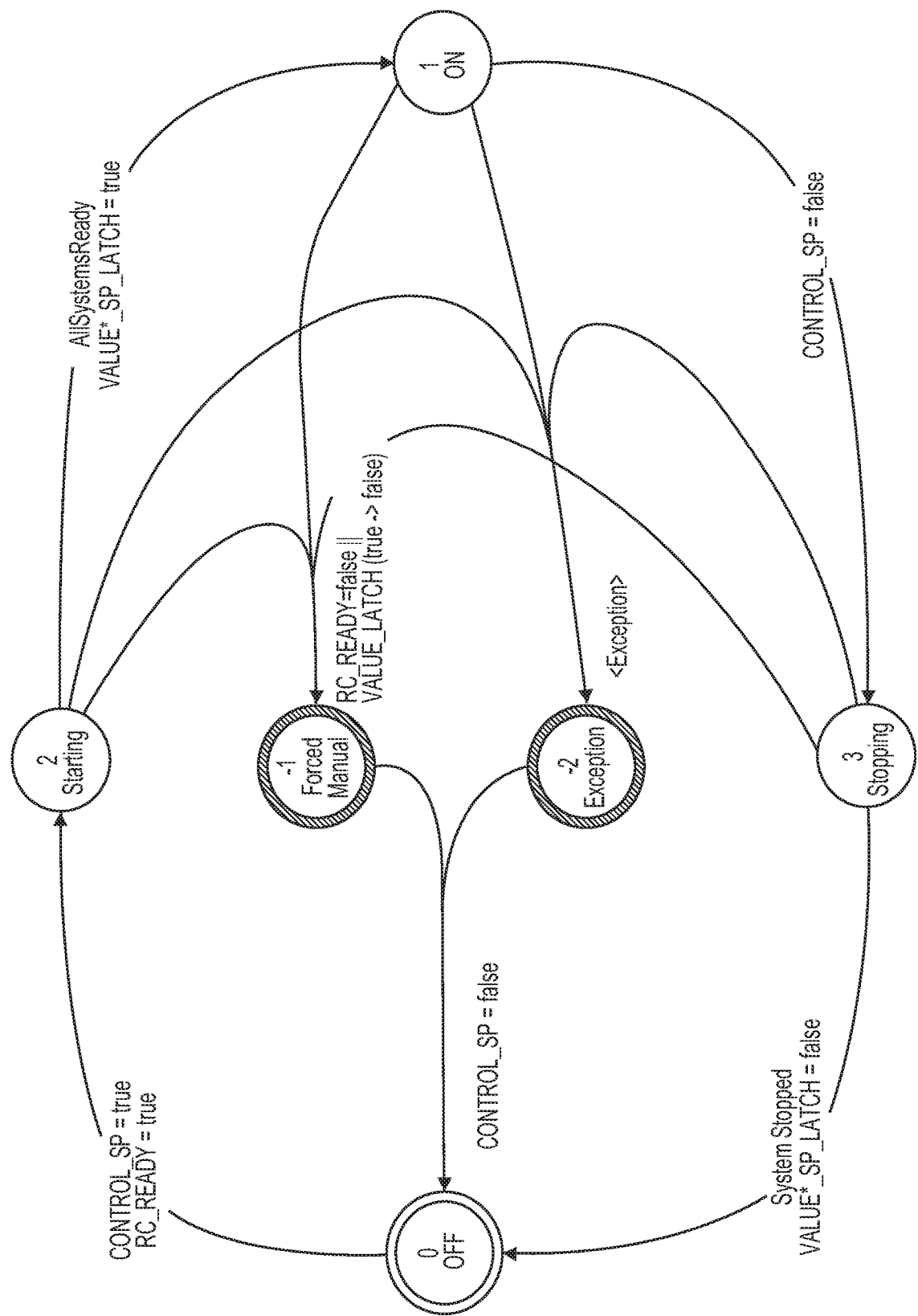
FIG. 3 is a state diagram illustrating logic for facilitating transfer of control between a control module and an automation agent deployed on the equipment in accordance with an example embodiment of the present disclosure.

FIG. 3 generally illustrates a state machine representing logic for facilitating transfer of control to an agent 120, 121, where set point latches are used to transition between local control of the industrial system to remote control by agent.

Figure 4:
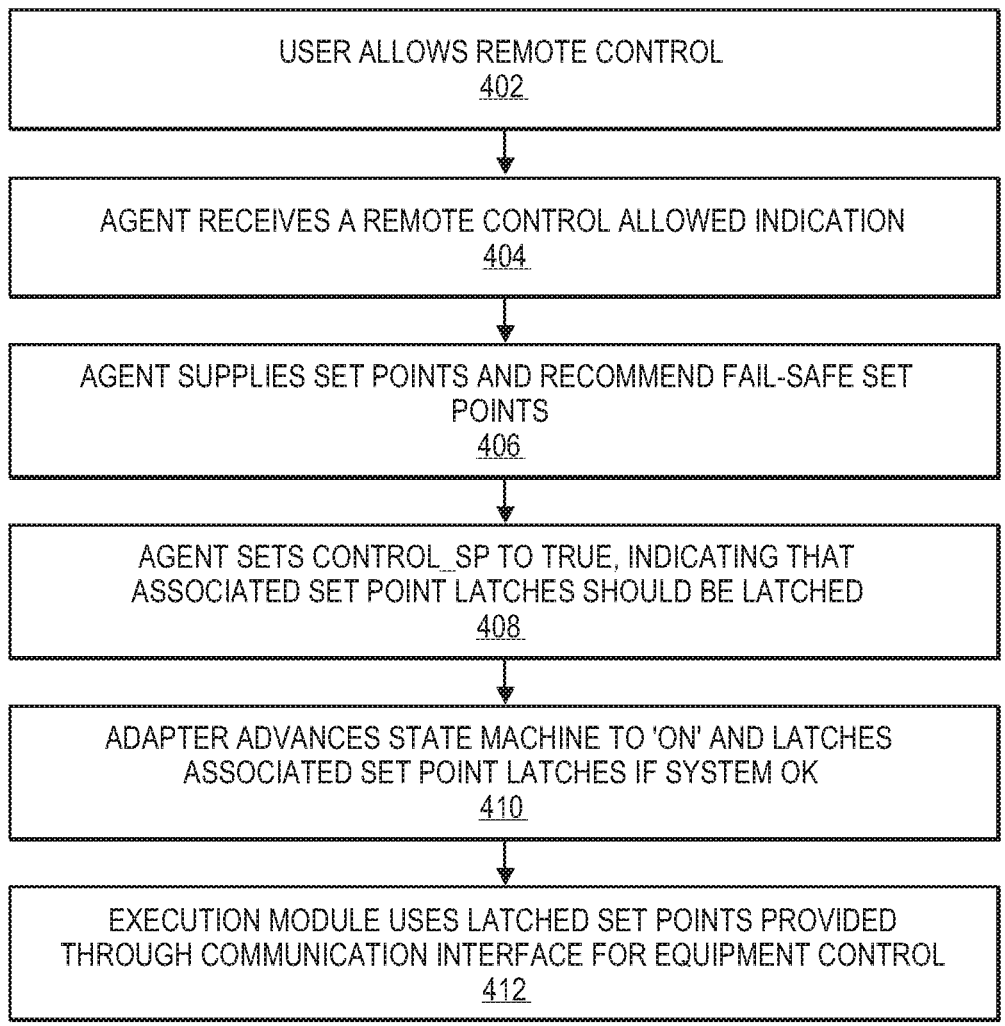
FIGS. 4 and 5 illustrate flow charts for furnishing control from a control module to a deployable automation agent in accordance with an example embodiment of the present disclosure.
Figure 5:
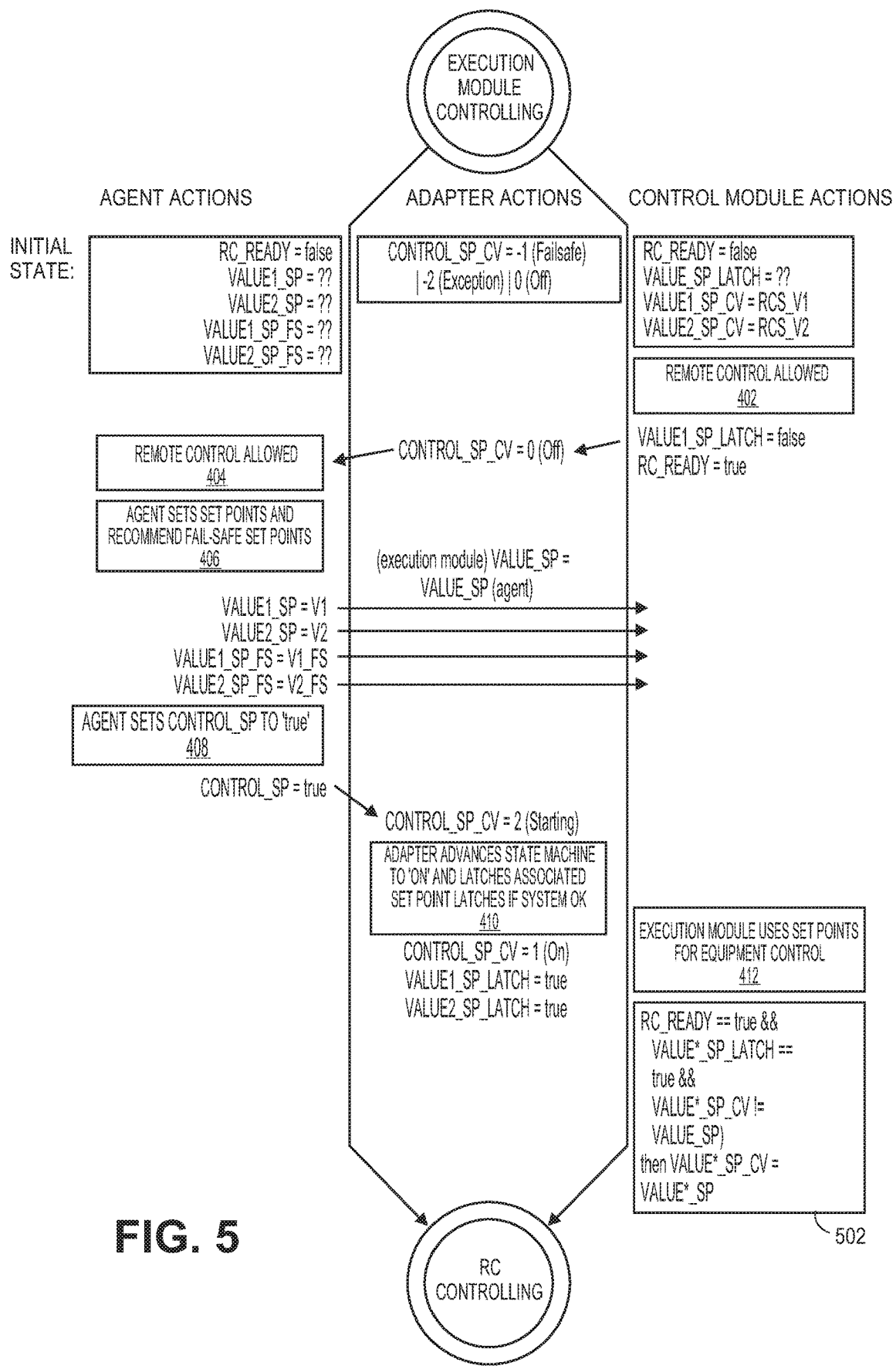

FIGS. 4 and 5 illustrate an example flow chart 400 for furnishing (e.g., providing) control from the control module to a respective agent. In one or more embodiments, the computing device 101 may present a user interface (e.g., user interface 102) to an operator of a drill rig to indicate that remote control is allowed. The operator of a drill rig can allow remote control for each operating characteristic or a sub-set of operating characteristics for the rig via the user interface, such as user interface 102 (Block 402). As shown in FIG. 4, a remote control indication is received (Block 404) by an agent. For example, the agents 120, 121 receive a remote control indication. The respective agent 120, 121 indicates to the adapter 201, which has implemented the state machine logic shown in FIG. 3, to go to starting by setting CONTROL_SP to 'true'. The state machine logic in FIG. 3 transitions from '0—OFF' to '2—Starting' when both CONTROL_SP is 'true' and RC_READY is 'true'.

As shown in FIG. 4, the adapter may perform a set of checks (Block 410) to determine whether an agent has provided appropriate set point and fail-safe set point values and whether the drill rig is in the proper state by examining values exposed in the communication interface for remote control 119. For example, the adapter 201 may determine whether an agent 120, 121 has provided appropriate set point and fail-safe set point values and whether the apparatus 100 is in a proper state by examining values exposed via the communication interface for remote control 119. The adapter 201 may also utilize contextual, historical, and/or real-time data values in determining the agent 120, 121 has provided the appropriate set point and fail-safe set point values (and whether the apparatus 100 is in the proper state). When the set of checks pass, the adapter latches (sets to 'true') associated set point latches, and the execution module, such as the execution module 118, utilizes set points and any future values of the set points from the agent (Block 412). At this point, the adapter 201 advances the state machine to '1—ON' as shown in FIG. 3. This state condition may continue until CONTROL_SP=false (e.g., transitioning the state machine logic to '3—Stopping') or a fail-safe event is detected (e.g., communication is lost). If a fail-safe event is detected the state machine logic is transitioned to '−2—Exception' and the fail-safe set point value is utilized. In some embodiments, a forced manual control may be implemented, which transitions the state machine logic to '−1—Forced Manual'. If the set of checks failed, the adapter 201 transitions the state machine shown in FIG. 3 to '−2—Exception'.

If the state machine is in the states '2—Starting', '1—ON', or '3—Stopping' and remote control is revoked, the state machine transitions to '−1—Forced Manual', indicating to agent 120, 121 that remote control has been revoked. The remote control operability may be revoked by the operator or by a forced unlatch of a respective latch utilized by the agent 120, 121.

If the state machine is in the states '2—Starting', '1—ON', or '3—Stopping' and there is a communication loss between the communication interface for remote control 119 and the agent 120, 121, the state machine logic advances to '−2—Exception'. The execution module 118 can use the recommended fail-safe set points if another set point value has not been preset.

In embodiments, a remote control ready having a true Boolean value can indicate to an automation agent 120, 121 that one or more set point values are available for remote control. As shown in FIG. 5, RC_READY comprises a false Boolean value at the start when the execution module 118 is controlling. When the execution module 118 is signaled by, for example, a user via the user interface 102, the RC_READY changes to a true Boolean value. The state machine, shown in FIG. 3, comprises a state of '−1—Forced Manual', '−2—Exception', or '0—OFF'. If the state machine controlled by the adapter 201 is in the state '−1—Forced Manual' or '−2—Exception' when the adapter 201 receives the signal that RC_READY is a true Boolean value, then the state changes to '0—OFF' as provided by the CONTROL_SP_CV of the adapter 201.

Once an agent 120, 121 receives indication that the RC_READY is a true Boolean value from the execution module 118, the agent 120, 121 sets respective set point values and recommended fail-safe set points the agent 120, 121 is to control. In FIG. 5, the agent 120, 121 sets set points VALUE1_SP to V1 and VALUE2_SP to V2, as well as, sets the associated fail-safe set points VALUE1_SP_FS to V1_FS and VALUE2_SP_FS to V2_FS. These values are sent and stored by the execution module 118. The respective agent 120, 121 then indicates to the adapter 201 that the agent 120, 121 can assume remote control by setting CONTROL_SP of the adapter 201 to a true Boolean value. Since RC_READY is a true Boolean value, CONTROL_SP is a true Boolean value, and CONTROL_SP_CV is '0—Off', the state machine hosted within adapter 201 advances to '2—Starting'.

The adapter 201 can perform checks to determine whether conditions are appropriate for remote control of the client 109, 113 while the state machine hosted within adapter 201 is in a '2—Starting' state. If conditions are not appropriate, the adapter 201 can set the CONTROL_SP_CV to '−2—Exception' to terminate the process. If conditions are appropriate, the adapter 201 latches the appropriate set points latches by setting VALUE1_SP_LATCH and VALUE2_SP_LATCH to a true Boolean value. The adapter 201 then sets CONTROL_SP_CS to '1—ON'.

When a value within the communication interface for remote control 119 changes, the execution module 118 evaluates the change and takes appropriate action. If RC_READY is a true Boolean value and VALUE1_SP_LATCH is a true Boolean value and VALUE1_SP_CV does not equal VALUE1_SP, then the execution module 118 applies the requested set point value to the appropriate equipment control module 112, 116, and, if accepted by the equipment control module 112, 116, the execution module 118 sets VALUE1_SP_CV to VALUE1_SP.

Figure 6:
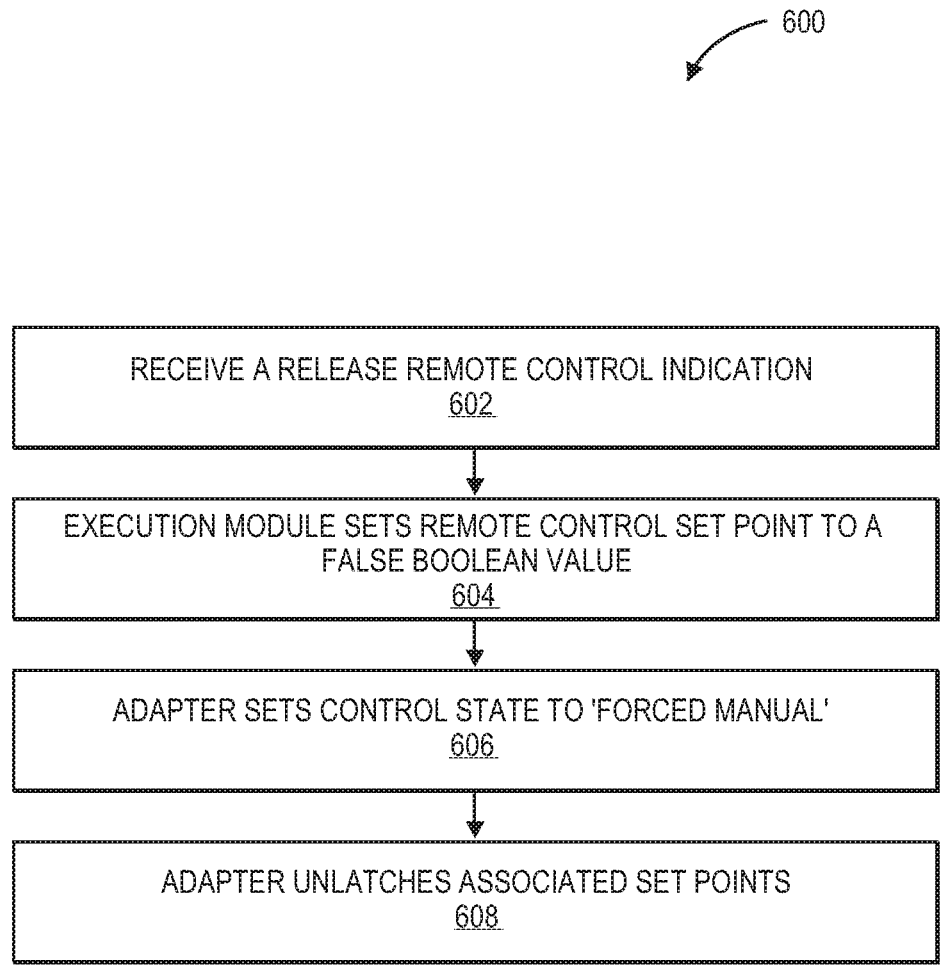
FIGS. 6 and 7 illustrate flow charts furnishing a manual control indication to force an automation agent to transition control from the deployable automation agent to the control module in accordance with an example embodiment of the present disclosure.
Figure 7:
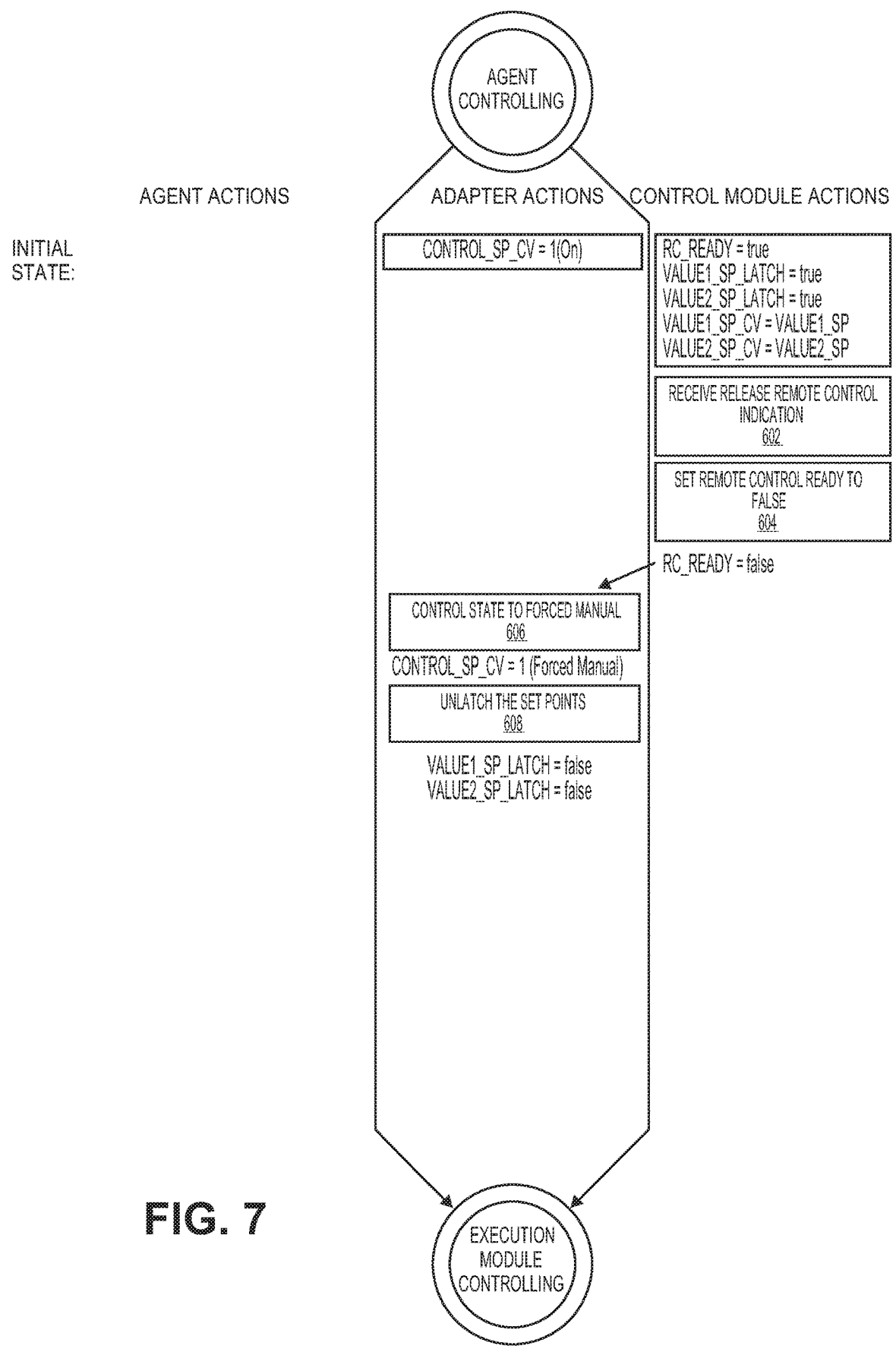

FIGS. 6 and 7 illustrate a method 600 for releasing control from the automation agent to the execution module 118 (e.g., rig control system). For example, in FIG. 7, an initial state is shown for the agent 120, 121 having control of set points VALUE1_SP and VALUE2_SP is shown. These values are indicated by RC_READY being a true Boolean value, VALUE1_SP_LATCH being a true Boolean value, and VALUE2_SP_LATCH being a true Boolean value. The agent 120, 121 is indicated control by CONTROL_SP_CV being '1—ON'. As shown in FIG. 6, an indication to release control is received (Block 602). This indication, for example, could be from an operator stopping remote control capability of one or more set points via the user interface 102 on the execution module 118, which sets RC_READY to a false Boolean value. As shown in FIGS. 6 and 7, the remote control set point is set to a false Boolean value, and, once the release indication is received, the control set point current value is transitioned to '−1—Forced Manual' (Block 606). Referring to FIG. 6, the adapter unlatches set points by setting VALUE1_SP_LATCH and VALUE2_SP_LATCH to a false Boolean value (Block 608). In one or more embodiments the VALUE1_SP_LATCH and VALUE2_SP_LATCH are set to false by the execution module 118. In another embodiment, the VALUE1_SP_LATCH and VALUE2_SP_LATCH are not changed and remote control functionality may not be engaged due to the logic described in Block 502 of FIG. 5.

Figure 8:
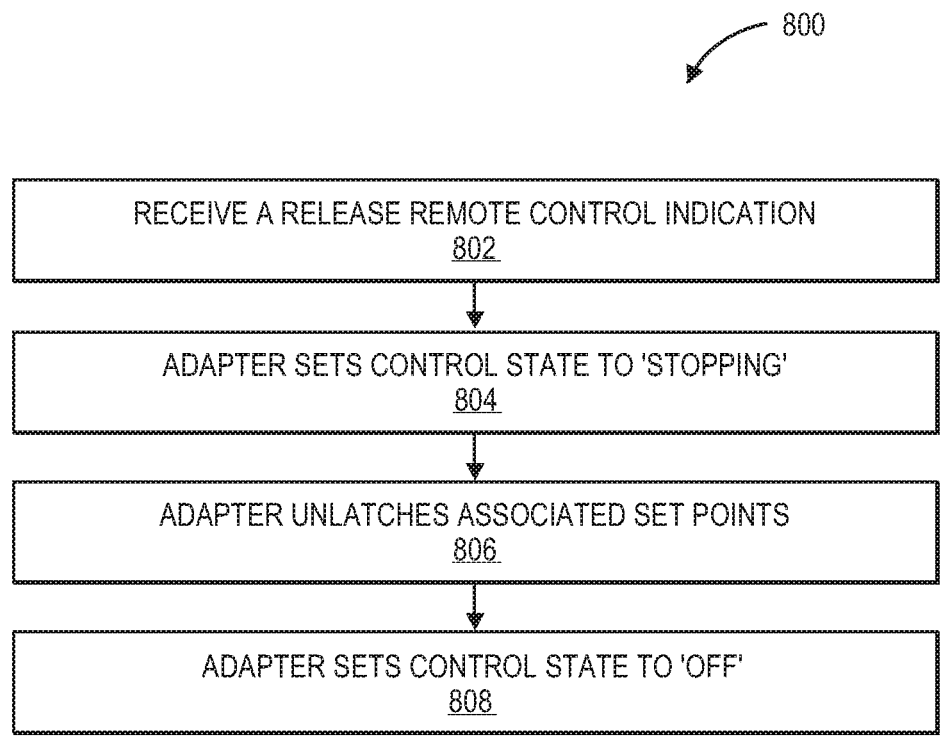
FIGS. 8 and 9 illustrate flow charts for releasing control from a deployable automation agent to the control module in accordance with an example embodiment of the present disclosure.
Figure 9:
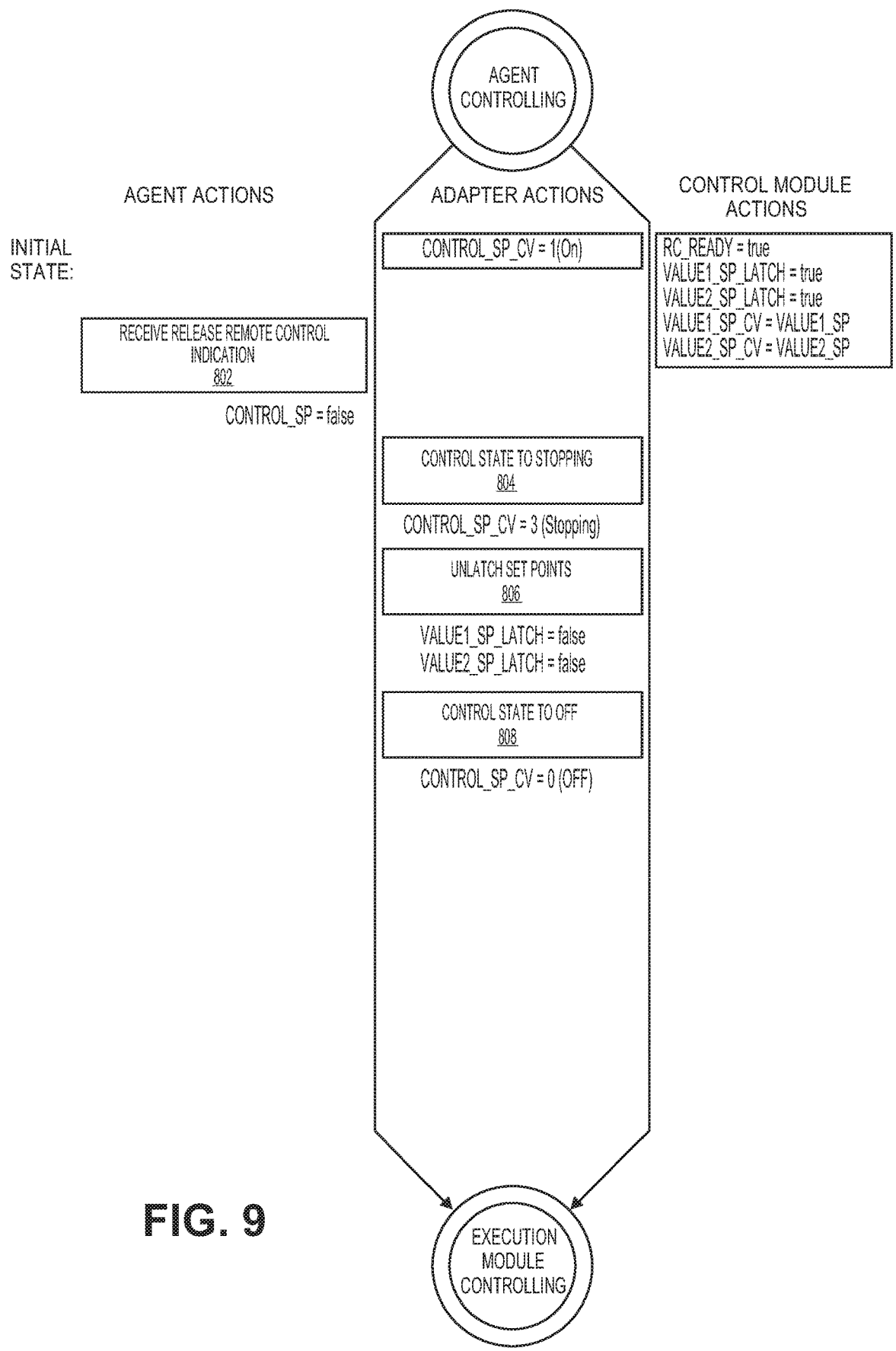

FIGS. 8 and 9 illustrate a method 800 of an agent releasing remote control. As an example, in FIG. 9, an initial state is shown for the agent 120, 121 having control of set points VALUE1_SP and VALUE2_SP. This is indicated by RC_READY being a true Boolean value, VALUE1_SP_LATCH being a true Boolean value, and VALUE2_SP_LATCH being a true Boolean value. As described herein and shown in FIG. 9, the agent 120, 121 is indicated as being in control through CONTROL_SP_CV being '1—ON'. As shown in FIG. 8, an indication to release control is received (Block 802) by setting CONTROL_SP to a false Boolean value, and the control state is set to '3—Stopping' (Block 804). For example, the adapter 201 sets CONTROL_SP_CV to '3—Stopping'. As shown in FIGS. 8 and 9, the associated set points are unlatched (Block 806). For example, the adapter 201 then unlatches the set points by setting VALUE1_SP_LATCH and VALUE2_SP_LATCH to a false Boolean value. The control state is transitioned to '0—Off' (Block 808) as shown in FIGS. 8 and 9. For example, the adapter 201 then sets the control state as shown in FIG. 3 to '0—Off' by setting CONTROL_SP_CV. In response, the execution module 118 does not communication the VALUE1_SP and VALUE2_SP to respective equipment control modules 112, 116 due to the logic described in Block 502 of FIG. 5.

Figure 10:
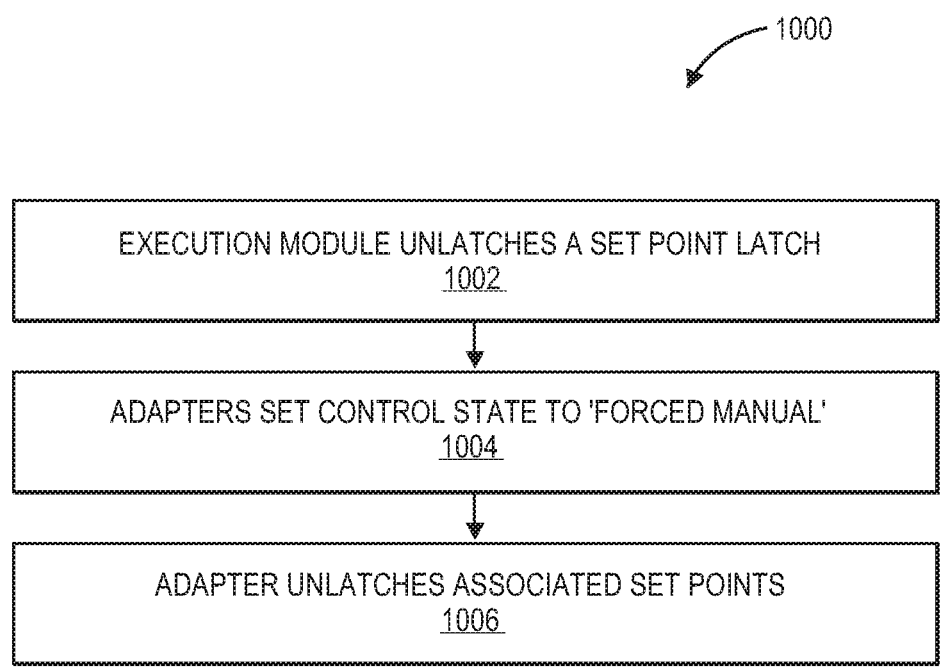
FIGS. 10 and 11 illustrate flow charts for controlling a current value that has been already latched by a deployable automation agent in accordance with an example embodiment of the present disclosure.
Figure 11:
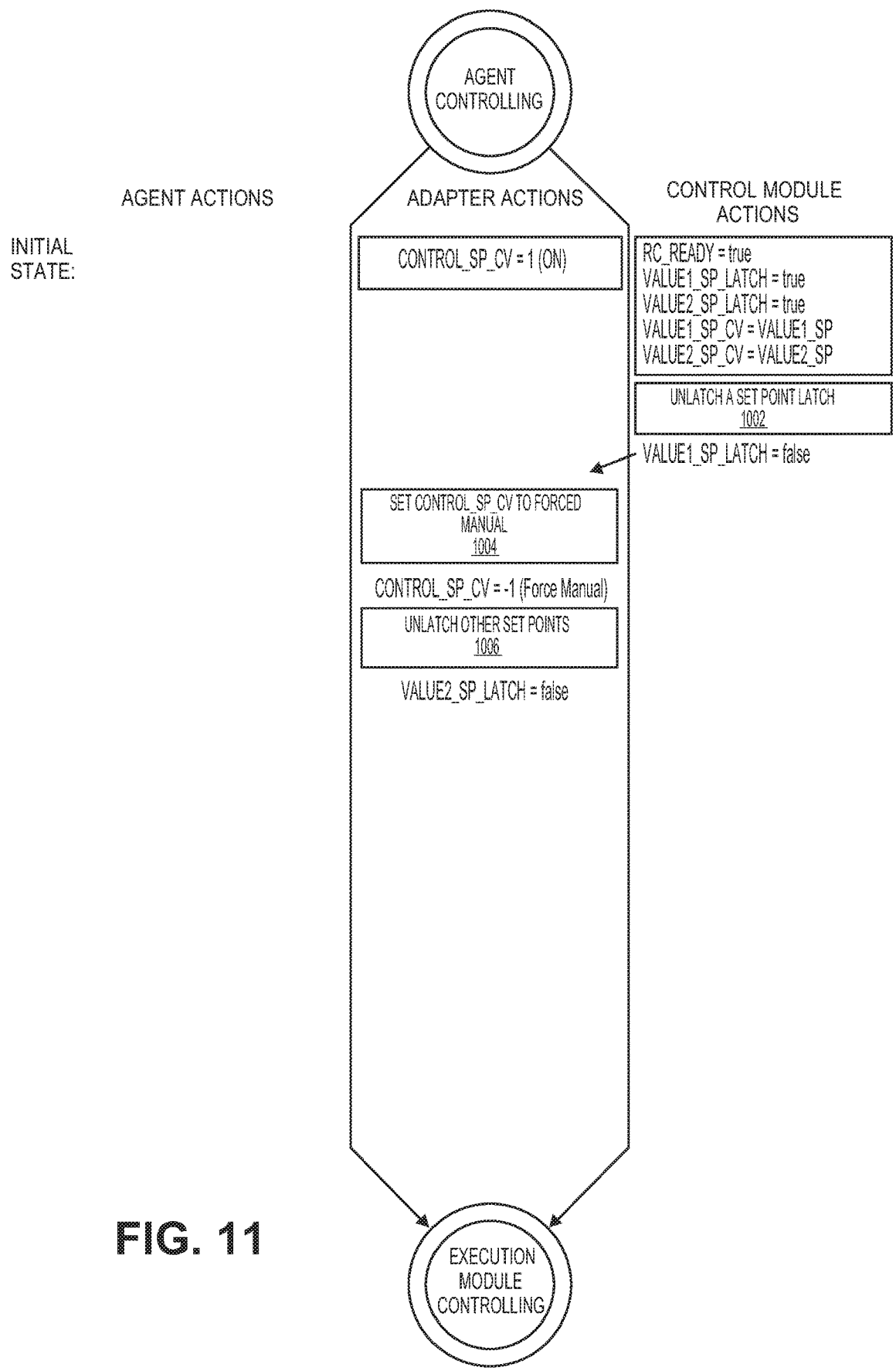

FIGS. 10 and 11 illustrate a method 1000 of a user forcing manual control. For example, in FIG. 11, an initial state is shown for the agent 120, 121 having control of set points VALUE1_SP and VALUE2_SP. This is indicated by RC_READY being a true Boolean value, VALUE1_SP_LATCH being a true Boolean value, and VALUE2_SP_LATCH being a true Boolean value. The agent 120, 121 is indicated control by CONTROL_SP_CV being '1—ON'. The user interface 102 allows the operator the ability to modify a set point that is being remote controlled. As shown in FIG. 10, a set point latch is unlatched. For example, upon the user requesting a change to the set point value, VALUE1_SP_CV, the execution module 118 unlatches the set point by setting VALUE1_SP_LATCH to a false Boolean value and the logic in Block 502 of FIG. 5 may prevent further set point values for this set point from being received from the agent 120, 121. The control state is transitioned to '−1—Forced Manual' (Block 1004) and then the associated set points are unlatched. After receiving the signal that VALUE1_SP_LATCH has changed to a false Boolean value, the adapter 201 sets the control state as shown in FIG. 3 to '−1—Forced Manual' and unlatches respective set points. In this example, the adapter 201 sets VALUE2_SP_LATCH to a false Boolean value, and the execution module 118 does not communicate the VALUE1_SP and VALUE2_SP to the respective equipment control modules 112, 116 due to the logic described in Block 502 of FIG. 5.

Figure 12:
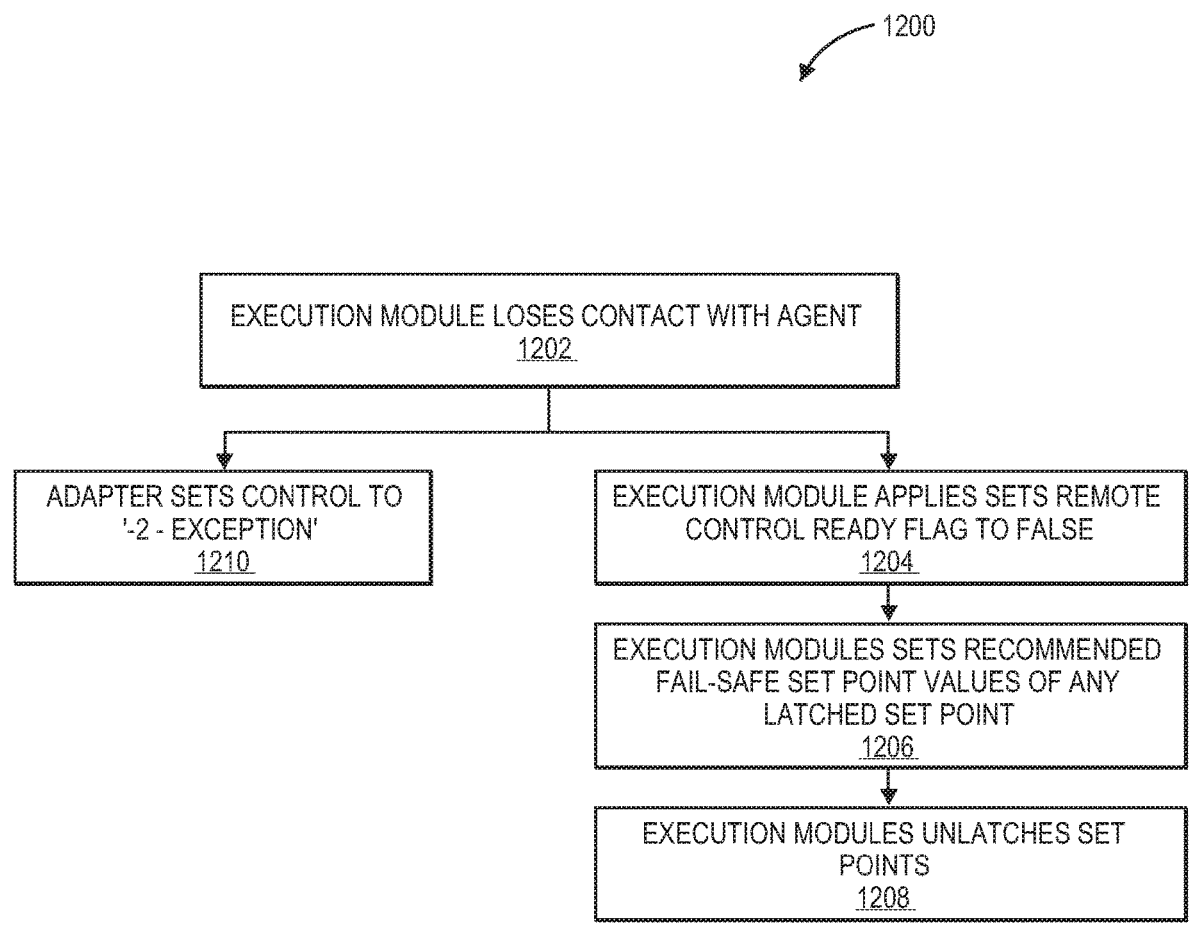
FIGS. 12 and 13 illustrate flow charts for using a recommended fail-safe set point in the event that a communication failure occurs.
Figure 13:
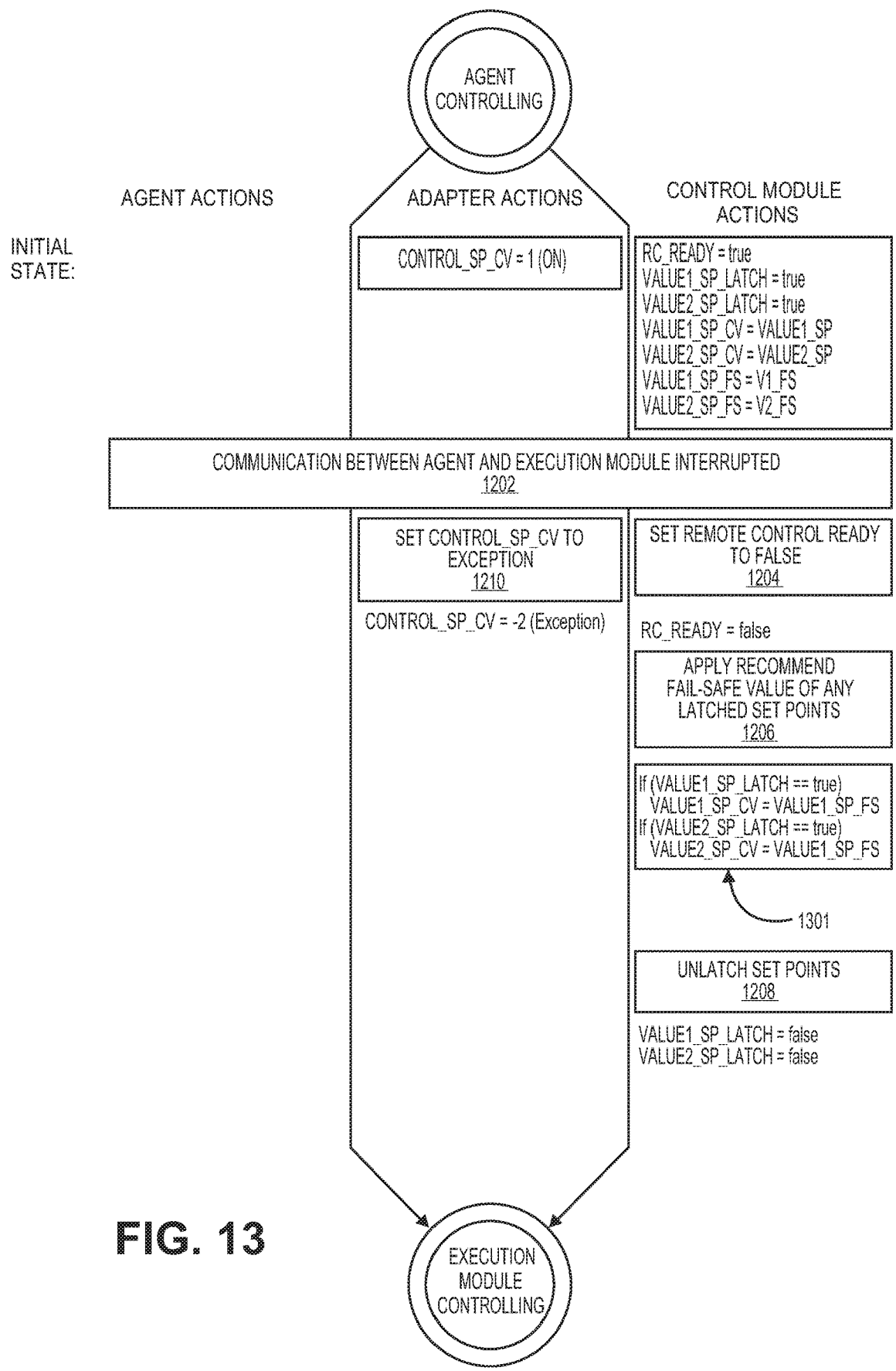

FIGS. 12 and 13 illustrate an embodiment when communication between the execution module 118 and the agent 120, 121 is interrupted. For example, in FIG. 13, an initial state is shown for the agent 120, 121 having control of set points VALUE1_SP and VALUE2_SP. This is indicated by RC_READY being a true Boolean value, VALUE1_SP_LATCH being a true Boolean value, and VALUE2_SP_LATCH being a true Boolean value. The agent 120, 121 is indicated control by CONTROL_SP_CV being '1—ON'. The execution module 118 has been provided with recommend fail-safe values V1_FS and V2_FS for VALUE1_SP_FS and VALUE2_SP_FS, respectively. As shown, a communication loss occurs between the execution module and a respective agent (Block 1202). In this example, a loss of communication occurs between agent 120, 121 and the execution module 118. This can be sensed by one or more methods, such as loss of a watch dog signal or a heartbeat. Once the loss of communication has been detected, a remote control indication is set to not ready (Block 1204). For example, the execution module 118 indicates that remote control is not ready by setting RC_READY to a false Boolean value. As shown in FIG. 12, the recommended fail-safe set point values of any latched set point are set (Block 1206), and the set points are unlatched (Block 1208). For example, the execution module 118 examines each associated set point latch to determine whether the latch is set to a true Boolean value. The execution module 118 then applies the recommend fail-safe set point to one or more latched set points, as shown in Block 1301 of FIG. 13. The execution module 118 then unsets the set point latches by setting VALUE1_SP_LATCH and VALUE2_SP_LATCH to a false Boolean value. In some embodiments, as shown in FIG. 12, the control state is transitioned to '−2—Exception' (Block 1210). For example, the adapter 201 can transition the control state logic to '−2—Exception' when a communication loss is detected.

In general, the routines executed to implement the embodiments disclosed herein, whether implemented as part of an operating system or a specific application, component, program, object, module or sequence of instructions, or even a subset thereof, will be referred to herein as "computer program code" or simply "program code." Program code typically comprises one or more instructions that are resident at various times in various memory and storage devices in a computer, and that, when read and executed by one or more processors in a computer, cause that computer to perform functions. Moreover, while embodiments have and hereinafter will be described in the context of fully functioning computers and computer systems, those skilled in the art will appreciate that the various embodiments are capable of being distributed as a program product in a variety of forms.

Such computer readable media can include computer readable storage media and communication media. Computer readable storage media is non-transitory in nature, and can include volatile and non-volatile, and removable and non-removable media implemented in any method or technology for storage of information, such as computer-readable instructions, data structures, program modules or other data. Computer readable storage media can further include random-access memory (RAM), read-only memory (ROM), erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computing device 101. Communication media can embody computer readable instructions, data structures or other program modules. By way of example, and not limitation, communication media can include wired media such as a wired network or direct-wired connection, and wireless media such as acoustic, RF, infrared and other wireless media. Combinations of any of the above can also be included within the scope of computer readable media.

It will be appreciated that agents, as well as the software components in computing device 101 implementing an automation server can be distributed among multiple computers, e.g., within clusters or even within distributed systems where computers are geographically distant from one another. A distributed system can be implemented on heterogeneous computer systems such that agents resident on different hardware and/or software environments. It will also be appreciated that security features can be implemented to ensure that authorized agents are permitted to interact with other agents and underlying hardware in an automation system. Furthermore, it will be appreciated that an automation server or an execution module can be resident in a single, central computer, or can be distributed among multiple computers (e.g., as a distributed service, a cluster, a cloud service, etc.).

Although a few example embodiments have been described in detail above, those skilled in the art will readily appreciate that many modifications are possible in the example embodiments without materially departing from "Interface For Automation Client." Accordingly, one or more of the modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An automation system comprising:
    an execution module implemented by a computing device, wherein the computing device comprises a central processing unit ("CPU") and a network interface coupled to the CPU, and wherein the execution module comprises a communication interface for remote control ("CIRC"); and
    a network connected to the CPU via the network interface and comprising:
        a plurality of clients comprising controllable equipment of a drilling rig, wherein a plurality of operating characteristics each characterize current operation of a corresponding one or more of the clients in response to a current value of a corresponding one of a plurality of set points collectively being used to control the clients, wherein the plurality of operating characteristics comprises at least one of drill revolutions per minute, mud pump flow rate, torque, and throttle position; and
        a plurality of agents each associated with a corresponding one of the set points,
            wherein each agent:
                receives from the CIRC a remote control indication of whether the corresponding set point is available for remote control by the agent;
                receives from the CIRC a current value for the corresponding set point;
                receives from the CIRC a latch indication of whether that agent is latched to the CIRC and, thereby, remotely controlling the corresponding set point;
                provides to the CIRC a remote controlled value to be used for the corresponding set point absent loss of communication between the CIRC and that agent; and
                provides to the CIRC a fail-safe value to be used for the corresponding set point upon loss of communication between the CIRC and that agent.

2. The automation system of claim 1 wherein the network further comprises an equipment control module operable to control ones of the set points not being controlled by any of the agents.

3. The automation system of claim 1 wherein the CPU is coupled to a memory and comprises a hardware-based microprocessor.

4. The automation system of claim 1 wherein the controllable equipment comprises a plurality of hardware controllers each associated with a corresponding one or more components of the drilling rig equipment.

5. The automation system of claim 4 wherein the controllable equipment further comprises a plurality of software controllers each associated with a corresponding one or more components of the drilling rig equipment.

6. The automation system of claim 1 wherein the network further comprises a plurality of sensors for collecting data related to an oil and gas process performed by the drilling rig via control of the controllable equipment.

7. The automation system of claim 6 wherein the network further comprises a real time data store storing the collected data.

8. The automation system of claim 1 wherein the execution module implements the CIRC using Object Linking and Embedding (OLE) for Process Control (OPC).

9. The automation system of claim 1 wherein the execution module comprises a connection manager controlling connection and communication with the agents.

10. The automation system of claim 1 wherein the execution module comprises a logger that creates, saves, and provides access to a log of transactions within and with the execution module.

11. The automation system of claim 1 wherein each agent automatically connects to the CIRC in response to connection of that agent to the network.

12. The automation system of claim 1 wherein the computing device comprises a user interface permitting a human operator to select which of the set points are made available for remote control.

13. The automation system of claim 12 wherein the user interface permits the human operator to manually interrupt remote control being performed by one of the agents.

14. The automation system of claim 1 wherein the plurality of operating characteristics comprises:
 drill revolutions per minute;
 mud pump flow rate;
 torque; and
 throttle position.

15. The automation system of claim 1 wherein the controllable equipment comprises:
 a mud pump;
 a hoist;
 a rotary device;
 a choke;
 a valve; and
 a blowout preventer.

16. The automation system of claim 1 wherein:
 the network interface is a first network interface;
 the computing device comprises a second network interface coupled to the CPU;
 the network is a first network connected to the CPU via the first network interface;
 the clients are first clients comprising controllable first equipment of the drilling rig;
 the operating characteristics are first operating characteristics;
 the set points are first set points collectively being used to control the first clients;
 the automation system further comprises a second network connected to the CPU via the second network interface and comprising a plurality of second clients comprising second controllable equipment of the drilling rig;
 a plurality of second operating characteristics each characterize current operation of a corresponding one or more of the second clients in response to a current value of a corresponding one of a plurality of second set points collectively being used to control the second clients;
 the agents are each associated with a corresponding one of the first or second set points; and
 each agent:
  receives from the CIRC a remote control indication of whether the corresponding first or second set point is available for remote control by the agent;
  receives from the CIRC a current value for the corresponding first or second set point;
  receives from the CIRC a latch indication of whether that agent is latched to the CIRC and, thereby, remotely controlling the corresponding first or second set point;
  provides to the CIRC a remote controlled value to be used for the corresponding first or second set point absent loss of communication between the CIRC and that agent; and
  provides to the CIRC a fail-safe value to be used for the corresponding first or second set point upon loss of communication between the CIRC and that agent.

17. The automation system of claim 16 wherein the first network is a non-deterministic network and the second network is a deterministic network.

18. The automation system of claim 16 wherein the first network further comprises an equipment control module operable to control ones of the first and second set points not being controlled by any of the agents.

19. The automation system of claim 16 wherein the second network further comprises an equipment control module operable to control the second set points in the absence of the execution module.

20. The automation system of claim 16 wherein:
 the first network further comprises a first equipment control module operable to control ones of the first and second set points not being controlled by any of the agents; and
 the second network further comprises a second equipment control module operable to control the second set points in the absence of the execution module.

* * * * *